United States Patent Office 3,053,630
Patented Sept. 11, 1962

3,053,630
PREPARATION OF BORANES
Robert S. Aries, 77 South St., Stamford, Conn.
No Drawing. Filed Dec. 4, 1957, Ser. No. 700,541
6 Claims. (Cl. 23—204)

This invention relates to novel process for the preparation of boranes. More particularly, the invention relates to the preparation of boranes from boric acid by conversion to an intermediate organic nitrogen containing derivative of boron, followed by reduction, preferably in situ, of said derivative to the borane.

Boranes, also known as boron hydrides, form a series of known compounds, of which the lowest member is diborane (diboron hexahydride) $B_2H$; other members of the borane series include tetraborane $B_4H_{10}$, pentaborane $B_5H_9$, hexaborane $B_6H_{10}$, and decaborane $B_{10}H_{14}$. These compounds, of which diborane is the best known member, are utilized in the synthesis of organic boron compounds and metal borohydrides, as polymerization catalysts for olefin hydrocarbons. Boranes are also used as starting materials in the preparation of certain types of high energy fuels. Although the boranes themselves possess fuel characteristics, they yield more valuable fuels when converted for example to alkyl derivatives, such as alkylated pentaborane and alkylated decaborane. The alkyl derivatives may be those containing lower alkyl, e.g. ethyl groups, most of which are liquids. The higher boranes, such as pentaborane and decaborane, are commonly obtained from diborane by pyrolysis.

Known methods of preparing boranes, such as diborane, include the reduction of boron trihalides, such as boron trichloride or trifluoride with hydrogen or with an alkali metal hydride. According to another known method, diborane is prepared by reaction of a boron trihalide with lithium aluminum hydride in ether solution or slurry. These prior art procedures have the disadvantage of being batch methods. They require the use of volatile and hazardous solvents and operating conditions, and of long periods of time for completion of the reaction, in some instances as much as 48 hours.

In accordance with the present invention it has been found that boranes may be produced by a direct and simple process starting with boric acid, and that said process may be operated as a continuous process, if desired. The process comprises the intermediate conversion of the boric acid to a nitrogen containing derivative of boron which is then reduced to a borane by means of a suitable reducing agent. The novel process of this invention may be operated continuously without isolation of the intermediate nitrogen containing boron derivative and with reduction of the latter to the borane in situ, with subsequent recovery of the borane.

In the first stage of borane production in accordance with my invention, boric acid is treated with an organic isocyanate until evolution of carbon dioxide ceases, to form an intermediate organic nitrogen derivative of boron. The organic isocyanate may be either a monoisocyanate of the formula RNCO, or a di-isocyanate of the formula $R(NCO)_2$, wherein R is an organic radical, such as aryl, cycloalkyl, or alkyl radical. Carbon dioxide is formed as a by-product.

Where an organic monoisocyanate is reacted with boric acid, an intermediate triamino substituted derivative of boron is formed in accordance with the equation $$3RNCO + H_3BO_3 \rightarrow B(NHR)_3 + 3CO_2 \qquad (1)$$

wherein R has the meaning referred to previously.

Where an organic di-isocyanate is reacted with boric acid, an intermediate nitrogen derivative of boron is formed in accordance with the equation $$2H_3BO_3 + 3R(NCO)_2 \rightarrow B_2(NRN)H_6 + 3CO_2 \qquad (2)$$

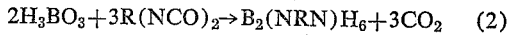

The first stage of the borane preparation method indicated by the foregoing equations is one in which the boric acid behaves as if it contains three hydroxyl groups with which isocyanate groups may react, liberating carbon dioxide, and forming the nitrogen containing boron derivative.

In the second stage of the process, the nitrogen containing boron intermediate is treated, preferably in situ, with a reducing agent suitable for removal of the organic amino or other nitrogen containing groups, resulting in regeneration of the organic isocyanate, and in conversion of the boron compound to hydrides of boron, i.e. boranes. As a reducing agent of this type I have found carbon monoxide to be most suitable. The reduction reaction utilizing carbon monoxide proceeds smoothly and does not require a catalyst, in accordance with the equations:

$$2B(NHR)_3 + 6CO \rightarrow B_2H_6 + 6RNCO \qquad (3)$$

or $$B_2(NRN)H_6 + 6CO \rightarrow B_2H_6 + 3R(NCO)_2 \qquad (4)$$

The organic mono- or di-isocyanate is regenerated and may be maintained or recycled in the reaction system.

It will be seen that the net reaction in accordance with my novel process is the reduction of boric acid with carbon monoxide to boranes in accordance with the equation $$2H_3BO_3 + 6CO \rightarrow B_2H_6 + 6CO_2 \qquad (5)$$

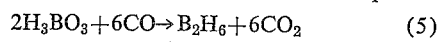

with boric acid and the organic isocyanates being fed into the reaction system, and gaseous carbon dioxide and boranes, and possibly excess carbon monoxide removed therefrom.

In accordance with the preferred mode of operation, boric acid is reacted with a slight excess of the stoichiometric equivalent of an organic mono- or di-isocyanate, the intermediate organic nitrogen containing boron compound formed remaining in situ, carbon dioxide being removed from the system, and carbon monoxide being supplied to the system to form boranes by reduction of the nitrogen containing intermediate.

In another method of operation, the intermediate nitrogen containing boron compound may be temporarily separated and then converted to boranes with carbon monoxide in the same or another reaction vessel.

The reaction may be carried out simply and directly, the boric acid and the isocyanate being in the dry state. However, under certain conditions in which better contact is required, a nonreactive solvent or carrier may be used.

When boric acid is reacted with an organic monoisocyanate, in accordance with stoichiometric considerations, 1 mole of boric acid will generally be reacted with at least 3 moles of the isocyanate. However, when a di-isocyanate is employed, in general two moles of boric acid will be reacted with at least three moles of the di-isocyanate. However, it will be understood that variations may be made in these molar ratios without hindering the course of the reaction.

When utilizing monoisocyanates, the reaction forming the nitrogen boron intermediate compound may begin as low as about 65° C, but usually begins at about 90° C., but depending upon the properties of the isocyanate employed, this temperature may be somewhat higher, extending to around 120° C. The reaction takes place satisfactorily without a catalyst, but if desired a catalyst can be employed, in an amount of about 1% by weight of the reactants. This enables the reaction to take place at a somewhat lower temperature, for example, about 70° to 80° C. When utilizing di-isocyanates for the reaction with boric acid the reaction temperatures range from about 65° C. upward. Where a catalyst is employed it is preferable of the tertiary amine type, such as, for example, triethylamine, dimethylethanolamine, or N-methylmorpholine. The intermediates here are polymeric.

Among the organic monoisocyanates which may be employed are included aryl, cycloalkyl, and alkyl derivatives, examples of which are phenyl, naphthyl, tolyl, cyclohexyl, butyl, and amyl monoisocyanates. The di-isocyanates which may be used also include aryl, cycloalkyl, and alkyl derivatives, examples of which include tolylene di-isocyanate, 3.3'-bitolylene-4.4'-di-isocyanate, diphenylmethane - 4.4' - di-isocyanate, 3.3' - dimethyl - diphenylmethane - 4.4' - di - isocyanate, hexamethylene di-isocyanate, naphthalene - 1.4 - di - isocyanate, cyclohexylene - 1.2 - di - isocyanate, propylene- and butylene di-isocyanates.

In the second stage of the reaction, which may be carried out in situ, reduction of the nitrogen containing boron intermediate compound takes place. This reduction is advantageously carried out with carbon monoxide, although any other reducing agent of this type may be used. The CO reacts with the NHR groups attached to the boron, with the formation of the original organic isocyanate RNCO, leaving the hydrogen bound to the boron atom as indicated in Equations 3 and 4 above, to form diborane and higher boranes. Depending on the nature of the organic radical R, a monoisocyanate or di-isocyanate is regenerated.

It has been found that the amount of CO added should be the stoichiometrical amount or a slight excess thereover. Use of excess CO is detrimental in that it leads to the formation of undesired by-products, such as possible carbonyls, which reduce borane yields. The carbon monoxide will preferably be added under a pressure of about 60 to 75 pounds per sq. in. gauge.

It has been found further that the temperature employed during CO treatment should be kept between about 150° and 220° C., preferably at about 175° C. for maximum borane yields. Higher temperatures tend to decrease the yield of diborane with attendant formation of higher boranes.

The following examples serve to illustrate the invention, but it is not to be taken as limited thereto.

*Example 1*

12.37 g. of pure anhydrous boric acid (0.2 mol) and 71.4 g. of phenyl isocyanate (0.6 mol) are placed in a 500 ml. pressure vessel. 1.0 g. of triethylamine catalyst is added under dry nitrogen atmosphere and the contents of the flask warmed slowly while passing in nitrogen. The reaction begins vigorously at about 80° with gas bubbles formed throughout the mass. The temperature is raised gradually to 110° C. $CO_2$ was evolved and a very thick viscous liquid was produced at 100° C. When this first stage of the reaction was indicated as complete by cessation of precipitation of limewater by the effluent gas, the material in the vessel was subjected to treatment with CO at 175° C. and about 75 pounds per sq. in. gauge pressure for about 30 minutes. The contents of the pressure vessel are gaseous boranes, and regenerated phenyl isocyanate. The boranes are principally (from 65% to 75%) diborane, the remainder about 20% to 30% higher boranes such as pentaborane and decaborane, and about 5% of an oily residual material of uncertain composition, believed to consist of boranes higher than decaborane.

*Example 2*

In a 500 ml. pressure vessel there are placed 12.37 g. of pure anhydrous boric acid (0.2 mol) and 52.25 g. of tolylene di-isocyanate (0.3 mol) which are warmed slowly under a dry nitrogen cover. When the reaction mass reaches a temperature of about 90° C. a vigorous reaction begins and gas bubbles are formed throughout the mass. Heating is continued to 110° C. for ½ hour when a sample of gas is found to be free of $CO_2$, by test with lime water. Carbon monoxide gas is then introduced from a pressure cylinder until about 6 g. have been added, the addition taking place under a pressure of about 60 pounds per sq. in. gauge while the temperature was raised to 175° C. during about 10 minutes, and held at 175° C. for about 30 minutes. The pressure, which may rise to about 100 pounds per sq. in. gauge, is allowed to drop to about 15 pounds per sq. in. gauge and the gaseous contents of the vessel are recovered, and analyzed. The yield of boranes, is 0.882 g., or about 20.1% of theoretical. There remained in the pressure vessel an oil. The oil was fractionated in vacuum to give a pale yellow liquid which is tolylene di-isocyanate, and a dark colored viscous residual oil remained which contained boron, but is of unknown composition, possibly higher boranes. Analysis showed the reaction products to contain about 70% diborane, about 10% each of pentaborane and decaborane, with about 5% in the form of the aforementioned residual boron-containing oil.

*Example 3*

This was run exactly like Example 2 except that 1% of N-methylmorpholine was added as a catalyst. The reaction began at 70°. Yields were approximately the same.

*Example 4*

Under approximately the same conditions as in Example 2, the charge obtained from the first stage of the reaction was heated to 220° C. in 10 minutes and held at that temperature for 30 minutes during which time CO was added under pressure of 60 pounds per sq. in. gauge. The yield of boranes, principally diborane, was about 14% of the theoretical, or less than in Example 2, possibly due to some pyrolysis of diborane to higher boranes at the higher temperature employed.

*Example 5*

Under approximately the same conditions as in Example 2, the charge obtained from the first stage of the reaction was heated at 150° C. for 30 minutes during the addition of the CO. The yield of diborane here was about 8% of theoretical.

*Example 6*

Under approximately the same conditions as in Example 2, the charge obtained from the first stage of the reaction was raised to 175° C. in 10 minutes and held at that temperature for about 30 minutes during which time CO was added under a pressure of 210 pounds per sq. in. gauge. Despite the use of more than a stoichiometric amount of CO, the yield of boranes was only about 7% of theoretical, indicating that some CO was consumed in the production of other and undesired products, possible carbonyls.

*Example 7*

Approximately 2 mols of boric acid were reacted with 3 mols of 3.3'-bitolylene-4.4'-di-isocyanate using 1% of N-methylmorpholine catalyst under conditions similar to those of Example 2. In the second stage of the reaction, CO was added under pressure while maintaining the temperature about 175° C. The yield of boranes was about 19.4% of theoretical.

It will be understood that different embodiments may be made without departing from the spirit and scope of this invention as defined in the appended claims.

I claim:

1. A process of preparing a boron hydride which comprises reacting 1 mol of boric acid and 3 mols of an organic monoisocyanate to form a triamino substituted derivative of boron in accordance with the equation

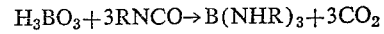

wherein R is a radical selected from the group consisting of aryl, cycloalkyl and alkyl, at a temperature above about 65° C. until carbon dioxide is no longer formed, and then treating the reaction product with carbon monoxide under a pressure of 60 to 75 pounds per sq. in.

gauge and at a temperature of about 150° C. to 220° C. to form the boron hydride, and recovering said boron hydride.

2. A process of preparing a boron hydride which comprises reacting 2 mols of boric acid and 3 mols of an organic diisocyanate to form a nitrogen containing derivative of boron in accordance with the equation $$2H_3BO_3 + 3R(NCO)_2 \rightarrow B_2(NRN)H_6 + 3CO_2$$

wherein R is a radical selected from the group consisting of aryl, cycloalkyl and alkyl, at a temperature above about 65° C. until carbon dioxide is no longer formed, and then treating the reaction product with carbon monoxide under a pressure of 60 to 75 pounds per sq. in. gauge and at a temperature of about 150° C. to 220° C. to form the boron hydride, and recovering said boron hydride.

3. The process of claim 1 in which the boric acid and the organic monoisocyanate are reacted in presence of a tertiary amine catalyst.

4. The process of claim 2 in which the boric acid and the organic di-isocyanate are reacted in presence of a tertiary amine catalyst.

5. A process of preparing diborane which comprises reacting 1 mol of boric acid and 3 mols of phenyl isocyanate at a temperature of about 90° C. in accordance with the equation $$H_3BO_3 + 3C_6H_5NCO \rightarrow B(NHC_6H_5)_3 + CO_2$$

until carbon dioxide is no longer formed, and then treating the reaction product with carbon monoxide under a pressure of 60 to 75 pounds per sq. in. gauge and at a temperature of about 150° C. to 220° C. to form the diborane, and recovering said diborane.

6. A process of preparing diborane which comprises reacting 2 mols of boric acid and 3 mols of tolylene diisocyanate at a temperature above about 65° C. in accordance with the equation $$2H_3BO_3 + 3CH_3C_6H_3(NCO)_2 \rightarrow B_2(NCH_3C_6H_3N)H_6 + 3CO_2$$

until carbon dioxide is no longer formed, and then treating the reaction product with carbon monoxide under a pressure of 60 to 75 pounds per sq. in. gauge and at a temperature of about 150° C. to 220° C. to form the diborane, and recovering said diborane.

References Cited in the file of this patent

UNITED STATES PATENTS 2,517,944     Upson _____ Aug. 8, 1950

OTHER REFERENCES

Gould et al.: "Boron Polymers, Final Report Covering the Interval from May 1, 1951 to April 30, 1952," prepared under Contract No. DA 36–039–SC 5492 for Dept. of Army ATI No. 185,191, pp. 24–27.

Degering: "An Outline of Organic Nitrogen Compounds," 1950.

Goodwin et al.: "Boron Hydrides and Related Substances," Part II, p. 57, April 1955, AD 85727.